(12) United States Patent
Wall et al.

(10) Patent No.: US 12,311,822 B2
(45) Date of Patent: May 27, 2025

(54) CONCRETE MIXER VEHICLE WITH TRAINER CAB

(71) Applicant: Oshkosh Corporation, Oshkosh, WI (US)

(72) Inventors: Eric Wall, Oshkosh, WI (US); David Anderson, Oshkosh, WI (US); Connor Hietpas, Oshkosh, WI (US)

(73) Assignee: OSHKOSH CORPORATION, Oshkosh, WI (US)

( * ) Notice: Subject to any disclaimer, the term of this patent is extended or adjusted under 35 U.S.C. 154(b) by 0 days.

(21) Appl. No.: 18/652,512

(22) Filed: May 1, 2024

(65) Prior Publication Data

US 2024/0367575 A1    Nov. 7, 2024

Related U.S. Application Data

(60) Provisional application No. 63/541,553, filed on Sep. 29, 2023, provisional application No. 63/463,510, filed on May 2, 2023.

(51) Int. Cl.
| | |
|---|---|
| *B60P 3/16* | (2006.01) |
| *B28C 5/42* | (2006.01) |
| *B60R 3/00* | (2006.01) |
| *B60S 1/04* | (2006.01) |
| *B62D 33/06* | (2006.01) |
| *B60R 5/00* | (2006.01) |

(52) U.S. Cl.
CPC .............. *B60P 3/16* (2013.01); *B28C 5/4237* (2013.01); *B28C 5/4272* (2013.01); *B60R 3/00* (2013.01); *B60S 1/0452* (2013.01); *B62D 33/06* (2013.01); *B28C 5/4248* (2013.01); *B60R 5/00* (2013.01)

(58) Field of Classification Search
CPC . B60P 3/16; B28C 5/4237; B28C 5/42; B28C 5/4272; B28C 5/4248; B60R 3/00; B60R 5/00; B60S 1/0452; B60S 1/04; B62D 33/06
USPC ........................................................ 180/89.12
See application file for complete search history.

(56) References Cited

U.S. PATENT DOCUMENTS

| | | | | |
|---|---|---|---|---|
| 4,480,845 | A | * | 11/1984 | Hansen .................. B60K 15/00 |
| | | | | 280/834 |
| 6,149,290 | A | * | 11/2000 | Quigley .................... B60P 3/16 |
| | | | | 296/64 |
| 2004/0178602 | A1 | * | 9/2004 | King ......................... B60R 3/00 |
| | | | | 280/163 |
| 2004/0245039 | A1 | | 12/2004 | Braun et al. |
| 2005/0001400 | A1 | | 1/2005 | Archer et al. |
| 2006/0192361 | A1 | | 8/2006 | Anderson et al. |

(Continued)

FOREIGN PATENT DOCUMENTS

| | | | |
|---|---|---|---|
| CN | 209176794 U | * | 7/2019 |
| CN | 214164860 U | * | 9/2021 |

*Primary Examiner* — Keith J Frisby
(74) *Attorney, Agent, or Firm* — Foley & Lardner LLP

(57) ABSTRACT

A concrete mixer vehicle includes a trainer cab that is coupled to a chassis and arranged laterally outwardly relative to a main cab. The trainer cab includes: (a) a seat mounted to a recessed mounting floor that is arranged rearward of a wheel well, (b) a support beam that includes an air vent and air flow path integrated into the support beam, or (c) a windshield wiper with a park location that is arranged between a trainer cab column and a superstructure support so that the windshield wiper is hidden from being viewed from within the main cab.

20 Claims, 13 Drawing Sheets

(56) References Cited

U.S. PATENT DOCUMENTS

| | | |
|---|---|---|
| 2006/0249325 A1 | 11/2006 | Braun et al. |
| 2009/0174158 A1 | 7/2009 | Anderson et al. |
| 2020/0290236 A1 | 9/2020 | Bjornstad et al. |
| 2020/0290237 A1 | 9/2020 | Steffens et al. |
| 2020/0290238 A1 | 9/2020 | Andringa et al. |
| 2020/0291846 A1 | 9/2020 | Steffens et al. |
| 2020/0317083 A1* | 10/2020 | Messina ................. B60K 17/28 |
| 2022/0072736 A1 | 3/2022 | Steffens et al. |
| 2024/0246472 A1 | 7/2024 | Holst et al. |

* cited by examiner

CONCRETE MIXER VEHICLE WITH TRAINER CAB

CROSS-REFERENCE TO RELATED PATENT APPLICATIONS

This application claims the benefit of and priority to U.S. Provisional Patent Application No. 63/463,510, filed on May 2, 2024, and U.S. Provisional Patent Application No. 63/541,553, filed on Sep. 29, 2023, each of which is hereby incorporated by reference herein in its entirety.

BACKGROUND

Concrete mixer vehicles are configured to receive, mix, and transport wet concrete or a combination of ingredients that when mixed form wet concrete to a job site. Concrete mixer vehicles include a rotatable mixing drum that receives concrete poured from vehicles or from stationary facilities, such as concrete mixing plants, and mixes the concrete disposed therein. Concrete mixer vehicles may be front discharge concrete mixer vehicles or rear discharge concrete mixer vehicles, which dispense concrete from the front or rear thereof, respectively. Rear discharge concrete mixer vehicles generally feature a drum with an outlet positioned at an aft end and a cab enclosure positioned at a fore end of the concrete mixer truck. Front discharge concrete mixer vehicles include a drum with an outlet supported above the cab enclosure of the concrete mixer vehicle to discharge concrete through a chute extending forward of the concrete mixer vehicle. Because front discharge concrete mixer vehicles discharge concrete at the fore end, they can be used to supply concrete to locations having limited access.

SUMMARY

One embodiment relates to a concrete mixer vehicle. The concrete mixer vehicle includes a chassis; an engine coupled to the chassis, a front axle coupled to the chassis, a rear axle coupled to the chassis, a main cab coupled to the chassis and defining an interior compartment, a trainer cab coupled to the chassis and arranged laterally outwardly relative to the main cab, a drum assembly coupled to the chassis, and a hopper actuator positioned to move the charge hopper between a first position and a second position. The trainer cab includes: (a) a seat mounted to a recessed mounting floor that is arranged rearward of a wheel well, (b) a support beam that includes an air vent and air flow path integrated into the support beam, or (c) a windshield wiper with a park location that is arranged between a trainer cab column and a superstructure support and hidden from being viewed from within the main cab. The drum assembly includes a mixing drum defining an aperture and an internal volume, a charge hopper positioned proximate the aperture, and a chute positioned proximate the aperture, beneath the charge hopper. The first position facilitates loading materials into the internal volume of the mixing drum via the charge hopper through the aperture, and the second position facilitates discharging the materials from the internal volume, through the aperture, and to the chute.

One embodiment relates to a concrete mixer vehicle. The concrete mixer vehicle includes a chassis; an engine coupled to the chassis, a front axle coupled to the chassis, a rear axle coupled to the chassis, a main cab coupled to the chassis and defining an interior compartment, a trainer cab coupled to the chassis and arranged laterally outwardly relative to the main cab, a drum assembly coupled to the chassis, a hopper actuator positioned to move the charge hopper between a first position and a second position, and a step ladder coupled to the chassis and arranged under the trainer cab and rearward of the front axle. The drum assembly includes a mixing drum defining an aperture and an internal volume, a charge hopper positioned proximate the aperture, and a chute positioned proximate the aperture, beneath the charge hopper. The first position facilitates loading materials into the internal volume of the mixing drum via the charge hopper through the aperture, and the second position facilitates discharging the materials from the internal volume, through the aperture, and to the chute.

One embodiment relates to a concrete mixer vehicle. The concrete mixer vehicle includes a chassis; an engine coupled to the chassis, a front axle coupled to the chassis, a rear axle coupled to the chassis, a main cab coupled to the chassis and defining an interior compartment, a trainer cab coupled to the chassis and arranged laterally outwardly relative to the main cab, a drum assembly coupled to the chassis, a hopper actuator positioned to move the charge hopper between a first position and a second position, and a step ladder coupled to the chassis and arranged under the trainer cab and rearward of the front axle. The trainer cab includes a seat mounted to a recessed mounting floor that is arranged rearward of a wheel well. The step ladder includes a fender plate that forms a portion of the wheel well. The drum assembly includes a mixing drum defining an aperture and an internal volume, a charge hopper positioned proximate the aperture, and a chute positioned proximate the aperture, beneath the charge hopper. The first position facilitates loading materials into the internal volume of the mixing drum via the charge hopper through the aperture, and the second position facilitates discharging the materials from the internal volume, through the aperture, and to the chute.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Figure 1:
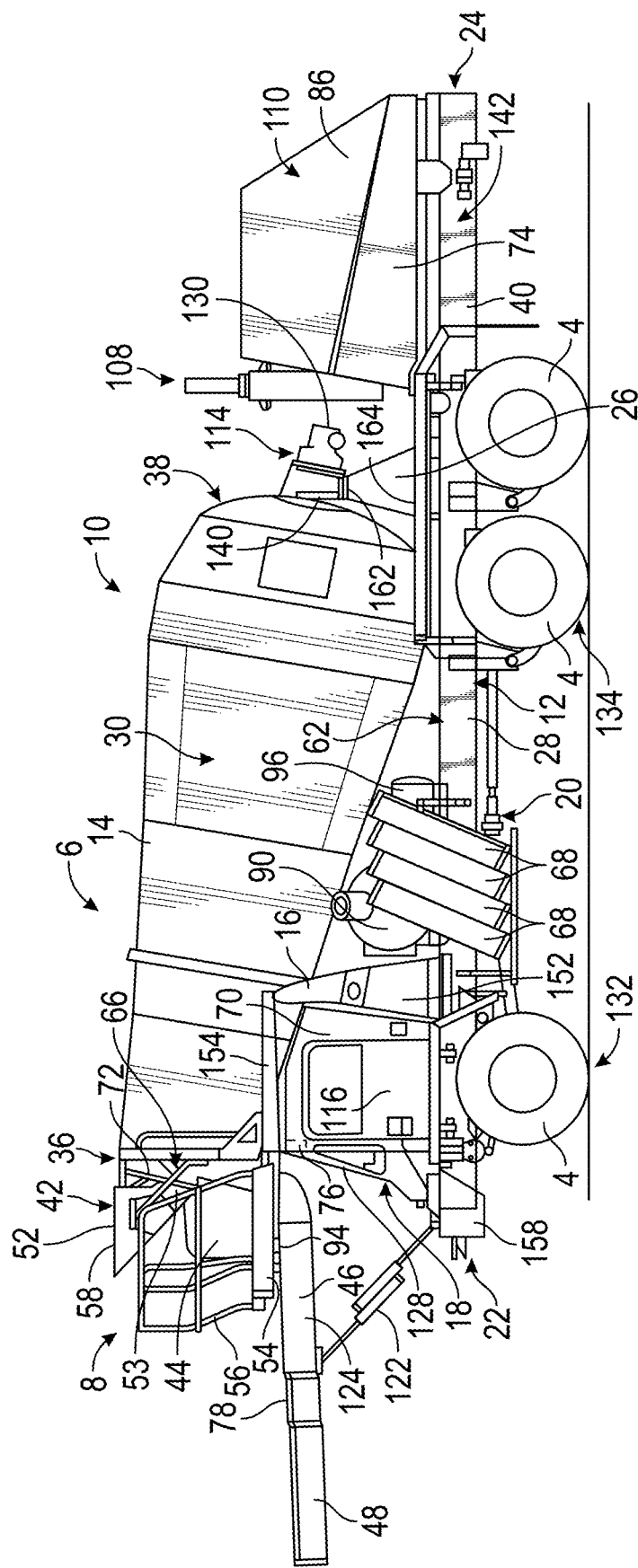
FIG. 1 is a side view of a concrete mixer truck, according to an exemplary embodiment.
Figure 2:
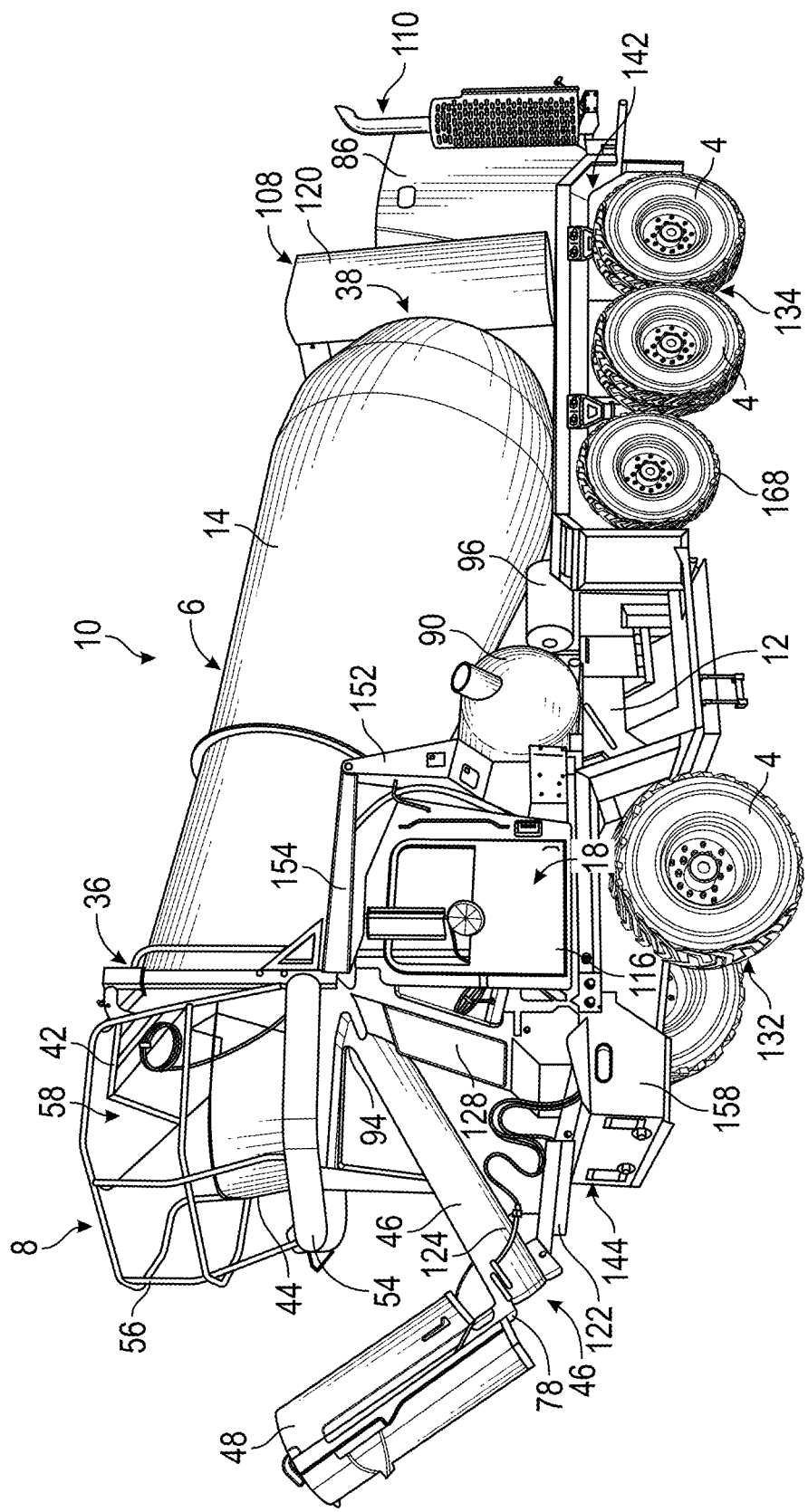
FIG. 2 is a front perspective view of the concrete mixer truck of FIG. 1, according to an exemplary embodiment.
Figure 3:
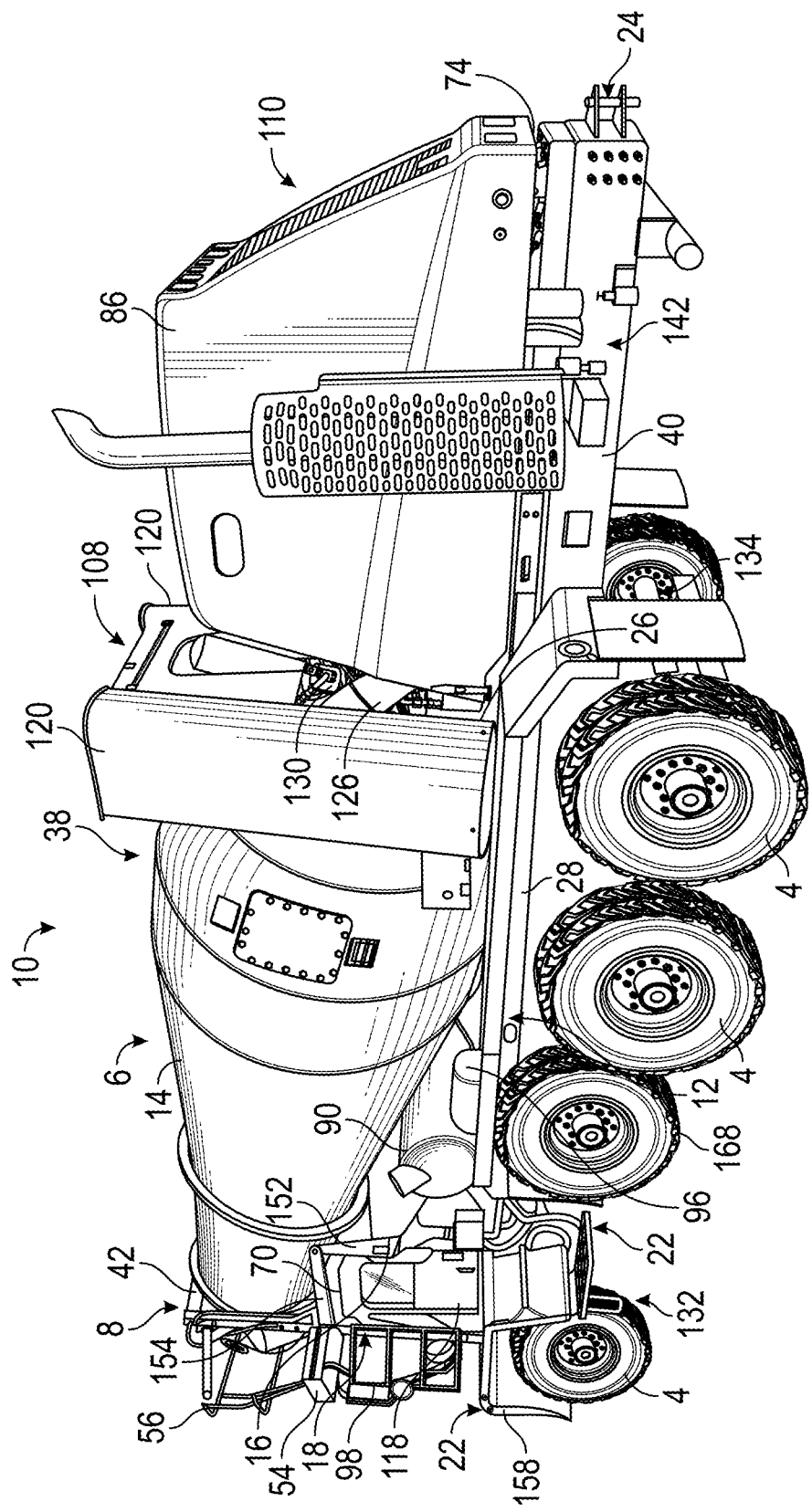
FIG. 3 is a rear perspective view of the concrete mixer truck of FIG. 1, according to an exemplary embodiment.
Figure 4:
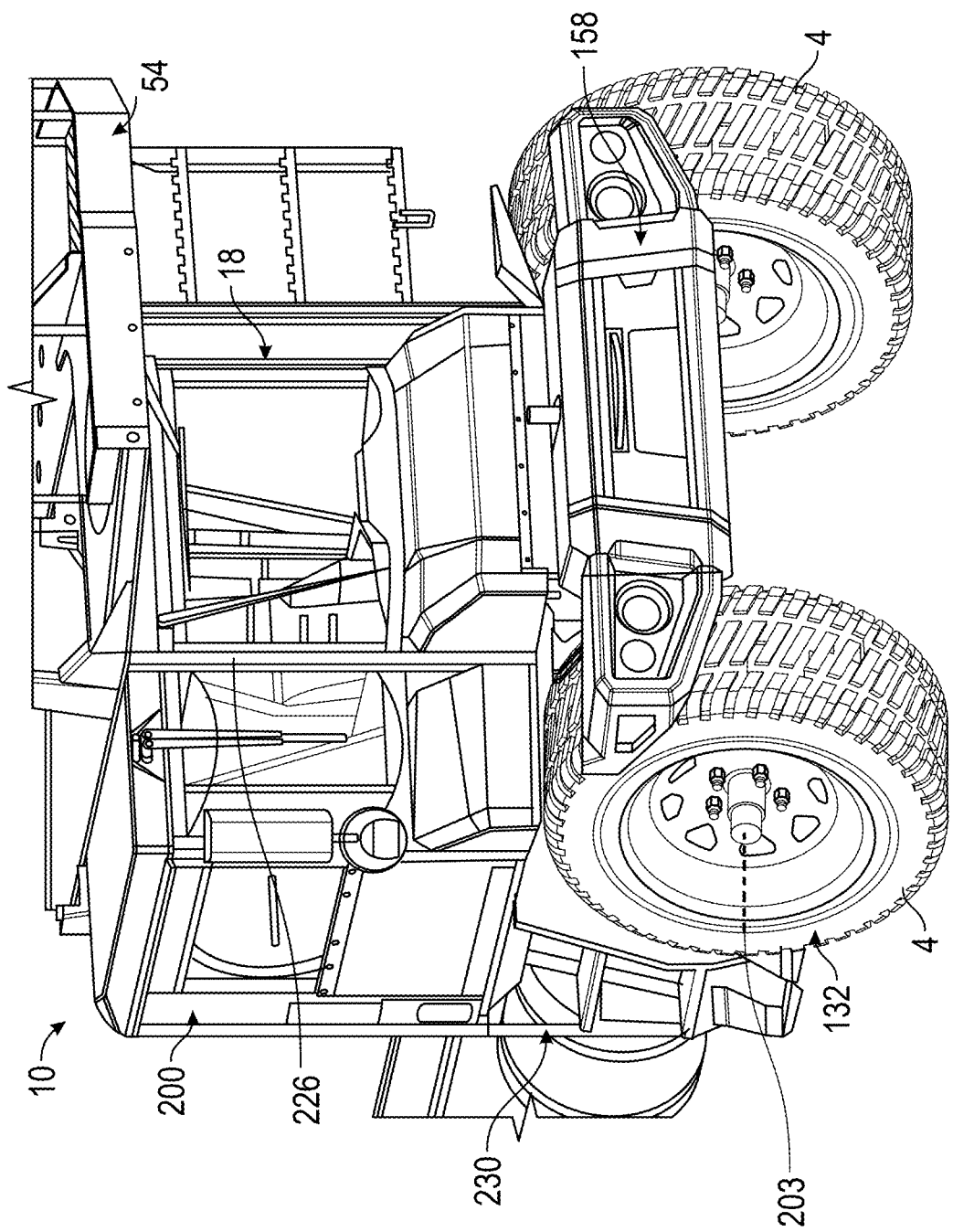
FIG. 4 is a perspective view of a concrete mixer truck with a trainer cab, according to an exemplary embodiment.

According to an exemplary embodiment, a concrete mixer vehicle may include a trainer cab that is supported on a chassis in a location that is laterally outward relative to a main cab. The trainer cab may include (a) a seat mounted to a recessed mounting floor that is arranged rearward of a wheel well, (b) a support beam that includes an air vent and air flow path integrated into the support beam, and/or (c) a windshield wiper with a park location that is arranged between a trainer cab column and a superstructure support and hidden from being viewed from within the main cab.
Overall Vehicle According to the exemplary embodiment shown in FIGS. 1-3, a vehicle, shown as concrete mixer truck 10, is configured to transport concrete from a loading location (e.g., a batching plant, etc.) to a point of use (e.g., a worksite, a construction site, etc.). In some embodiments, as shown in FIGS. 1-3, the concrete mixer truck 10 is a front discharge concrete mixer vehicle. In other embodiments, the concrete mixer truck 10 is a rear discharge concrete mixer vehicle. The concrete mixer truck 10 includes a chassis 12, a drum assembly 6, a hopper assembly 8, a drive system 20, a fuel system 108, and an engine module 110. The concrete mixer truck 10 may include various additional engine, transmission, drive, electronic, tractive assembly, braking, steering and/or suspension systems, and hydraulic systems that are configured to support the various components of the concrete mixer truck 10. Generally, the chassis 12 supports a mixing drum 14 of the drum assembly 6, a front pedestal 16, a rear pedestal 26, a cab 18, and the engine module 110. Each of the chassis 12, the drum assembly 6, the hopper assembly 8, the drive system 20, the fuel system 108, and the engine module 110 are configured to facilitate receiving, mixing, transporting, and delivering concrete to a job site via the concrete mixer truck 10.

The chassis 12 includes a frame 28 that extends from a front end 22 to a rear end 24 of the concrete mixer truck 10. Wheels 4 are coupled to the frame 28 and moveably support the frame 28 above a ground surface or road. The wheels 4 may be replaced by other ground engaging motive members, such as tracks. In some embodiments, the chassis 12 includes hydraulic components (e.g., valves, filters, pipes, hoses, etc.) coupled thereto that facilitate operation and control of a hydraulic circuit including a drum drive pump and/or an accessory pump. The frame 28 provides a structural base for supporting the mixing drum 14, the front pedestal 16, the rear pedestal 26, the cab 18, and the engine module 110. In some embodiments, the frame 28 includes a widened front portion that extends over and about the wheels 4 positioned at the front end 22 of the chassis 12 to simultaneously support the cab 18 and serve as a fender for the wheels 4 positioned at the front end 22 of the chassis 12. The frame 28 may include lift eyes or other structures that facilitate lifting along the chassis 12 such that the chassis 12 can be manipulated as a subassembly for assembly and/or maintenance of the concrete mixer truck 10. One or more components may be coupled to the chassis 12 using isolating mounts made of a compliant material, such as rubber. The isolating mounts may be configured to reduce the transfer of vibrations between the components and the chassis 12.

The frame 28 includes a pair of frame rails 40 coupled with intermediate cross members, according to an exemplary embodiment. The frame rails 40 extend in a generally-horizontal and longitudinal direction (e.g., extend within 10 degrees of perpendicular relative to a vertical direction, extend within ten degrees of parallel relative to a ground surface when concrete mixer truck 10 is positioned on flat ground, etc.) between the front end 22 and the rear end 24. The frame rails 40 may be elongated "C-channels" or tubular members, according to various exemplary embodiments. In other embodiments, the frame rails 40 include another type of structural element (e.g., monocoque, a hull, etc.). In still other embodiments, the frame rails 40 include a combination of elongated C-channels, tubular members, a monocoque element, and/or a hull element. A first frame rail 40 may be disposed along a first lateral side 142 and a second frame rail 40 may be disposed along a second lateral side 144, respectively, of the concrete mixer truck 10. By way of example, the first lateral side 142 of the chassis 12 may be the left side of the concrete mixer truck 10 (e.g., when an operator is sitting in the cab 18 and positioned to drive the concrete mixer truck 10, etc.) and the second lateral side 144 of the chassis 12 may be the right side of the concrete mixer truck 10 (e.g., when an operator is sitting in the cab 18 and positioned to drive the concrete mixer truck 10, etc.).

The cab 18 is coupled to the frame rails 40 proximate the front end 22 of the chassis 12. According to various embodiments, the cab 18 (e.g., operator cabin, front cabin, etc.) is configured to house one or more operators during operation of the concrete mixer truck 10 (e.g., when driving, when dispensing concrete, etc.), and may include various components that facilitate operation and occupancy of the concrete mixer truck 10 (e.g., one or more seats, a steering wheel, control panels, screens, joysticks, buttons, accelerator, brake, gear lever, etc.). The cab 18 includes a housing 70 that forms the structure of the cab 18. At least one door 116 is affixed to the housing 70 to allow an operator to enter and exit the cab 18. A windshield 128 is disposed along a front side of the housing 70, near the front end 22, and above a front bumper 158 of the concrete mixer truck 10. The windshield 128 is configured to provide visibility to the operator while driving the concrete mixer truck 10, operating a main chute 46, and completing other tasks. The front bumper 158 may be affixed to a bottom portion of the housing 70. In some embodiments, the front bumper 158 is affixed to the frame 28 at the front end 22 of the concrete mixer truck 10.

A control assembly 76 is disposed within the cab 18 and is configured to control one or more components of the concrete mixer truck 10. The control assembly 76 may include controls, buttons, joysticks, and other features that control the movement and orientation of the concrete mixer truck 10, the hopper assembly 8, the main chute 46, a charge hopper 42, a discharge hopper 44, the mixing drum 14, and/or other components of the concrete mixer truck 10. For example, the control assembly 76 may include overhead controls (e.g., in a forward overhead position) that allow an occupant of the cab 18 to toggle a switch from a 'Close' position to an 'Open' position to open and close the charge hopper 42 and/or the discharge hopper 44. In some embodiments, the control assembly 76 includes a user interface with a display and an operator input. The display may be configured to display a graphical user interface, an image, an icon, or still other information. In one embodiment, the display includes a graphical user interface configured to provide general information about the concrete mixer truck 10 (e.g., vehicle speed, fuel level, warning lights, etc.). The graphical user interface may also be configured to display a current mode of operation, various potential modes of operation, or still other information relating to a transmission, modules, the drive system 20, and/or other components of the concrete mixer truck 10.

An air tank 96 is coupled to and supported by the chassis 12 and positioned directly beneath the mixing drum 14. The air tank 96 is configured to store compressed air (e.g., for use in an air brake system, for use when raising and lowering a pusher axle assembly, etc.). A water tank 90 extends laterally across the length of the chassis 12, forward of the air tank 96. The water tank 90 is coupled to the frame rails 40 and positioned beneath the mixing drum 14. The water tank 90 may be coupled to a water pump that is used to supply water from the water tank 90 to wash the concrete mixer truck 10 after pouring a concrete load and/or to add water to the concrete within the mixing drum 14 at the construction site and/or during transit, among other uses.

The drum assembly 6 is configured to store, mix and dispense concrete. The drum assembly 6 includes the mixing drum 14, a drum driver 114, and the hopper assembly 8. The mixing drum 14 extends longitudinally along a majority of the length of concrete mixer truck 10 and may be angled relative to the frame rails 40 (e.g., when viewed from the side of concrete mixer truck 10). The mixing drum 14 has a first end 36 that is positioned toward the front end 22 of the concrete mixer truck 10 and coupled to the front pedestal 16 (e.g., support post, support column, etc.). The first end 36 may at least partially extend over the cab 18. The first end 36 defines a drum opening 72 in communication with the hopper assembly 8 through which concrete may flow (e.g., between the charge hopper 42, the mixing drum 14, the discharge hopper 44, the main chute 46, and extension chutes 48, etc.). The mixing drum 14 has a second end 38 that is positioned toward the rear end 24 of the concrete mixer truck 10 and coupled to the rear pedestal 26 (e.g., support post, support column, etc.). The mixing drum 14 may be rotatably coupled to front pedestal 16 (e.g., with a plurality of wheels or rollers, etc.) and rear pedestal 26 (e.g., with a drum drive transmission, etc.). Each of the front pedestal 16 and the rear pedestal 26 may be a part of a superstructure of the concrete mixer truck 10. The superstructure further includes the frame 28 and the chassis 12. In other embodiments, the mixing drum 14 is otherwise coupled to the frame rails 40. Although the concrete mixer truck 10 illustrated in FIGS. 1-3 is a front discharge concrete mixer vehicle, it is to be understood that in other embodiments the concrete mixer truck 10 may include a drum assembly 6 having any other discharge arrangement (e.g., rear discharge).

The front pedestal 16 includes a lower portion 152 and an upper portion 154. The lower portion 152 is coupled to and supports the hopper assembly 8. The upper portion 154 is coupled to the frame rails 40 and supports the lower portion 152 of the front pedestal 16 and the first end 36 of the mixing drum 14. The rear pedestal 26 includes an upper portion 162 and a lower portion 164. The lower portion 164 is coupled to the frame rails 40 and supports the upper portion 162. The upper portion 162 supports a bottom interface of a drum drive transmission 140 (e.g., a bottom portion of the housing thereof) and/or the second end 38 of the mixing drum 14. In some embodiments, the rear pedestal 26 includes a pair of legs extending between the frame rails 40 and the drum drive transmission 140.

The drum opening 72 at the first end 36 of the mixing drum 14 is configured to receive a mixture, such as a concrete mixture, or mixture ingredients (e.g., cementitious material, aggregate, sand, etc.) such that the mixture can enter and exit an internal volume 30 of the mixing drum 14. The mixing drum 14 may include a mixing element (e.g., fins, etc.) positioned within the internal volume 30. The mixing element may be configured to (i) agitate the contents of mixture within the mixing drum 14 when the mixing drum 14 is rotated in a first direction (e.g., counterclockwise, clockwise, etc.) and (ii) drive the mixture within the mixing drum 14 out through the drum opening 72 when the mixing drum 14 is rotated in an opposing second direction (e.g., clockwise, counterclockwise, etc.). During operation of the concrete mixer truck 10, the mixing elements of the mixing drum 14 are configured to agitate the contents of a mixture located within the internal volume 30 of the mixing drum 14 as the mixing drum 14 is rotated in a counterclockwise and/or a clockwise direction by the drum driver 114.

The drum driver 114 is configured to provide an input (e.g., a torque, etc.) to the mixing drum 14 to rotate the mixing drum 14 relative to the chassis 12. The drum driver 114 may be configured to selectively rotate the mixing drum 14 clockwise or counterclockwise, depending on the mode of operation of the concrete mixer truck 10 (i.e., whether concrete is being mixed or dispensed). The drum driver 114 is coupled to a rear or base portion of the second end 38 of the mixing drum 14 and a top end of the lower portion 164 and/or a lower end of the upper portion 162 of the rear pedestal 26. The drum driver 114 includes a transmission, shown as drum drive transmission 140, and a driver, shown as drum drive motor 130, coupled to drum drive transmission 140. The drum drive transmission 140 extends rearward (e.g., toward the rear end 24 of the concrete mixer truck 10, toward the engine module 110, etc.) from the second end 38 of mixing drum 14 and the drum drive motor 130 extends rearward from drum drive transmission 140. In some embodiments, the drum drive motor 130 is a hydraulic motor. In other embodiments, the drum drive motor 130 is another type of actuator (e.g., an electric motor, etc.). The drum drive motor 130 is configured to provide an output torque to the drum drive transmission 140, according to an exemplary embodiment, which rotates the mixing drum 14 about a rotation axis. The drum drive transmission 140 may include a plurality of gears (e.g., a planetary gear reduction set, etc.) configured to increase the turning torque applied to the mixing drum 14, according to an exemplary embodiment. The plurality of gears may be disposed within a housing. In some embodiments, a drum drive pump and/or accessory pump may be configured to receive rotational mechanical energy and output a flow of pressurized hydraulic fluid to drive one or more components of the concrete mixer truck 10.

The hopper assembly 8 is positioned at the drum opening 72 of the mixing drum 14. The hopper assembly 8 is configured to introduce materials into and allow the materials to flow out of the internal volume 30 of the mixing drum 14 of the concrete mixer truck 10. The hopper assembly 8 is configured to prevent loss of material or spillage when the material enters and exits the mixing drum 14. The hopper assembly 8 includes the charge hopper 42, the discharge hopper 44, a hopper actuator 66, a platform 54, and the main chute 46, which are positioned above and at least partially forward of the cab 18 of the concrete mixer truck 10. The charge hopper 42 is configured to direct the materials (e.g., cement precursor materials, etc.) into the drum opening 72 of the mixing drum 14. The discharge hopper 44 is configured to dispense mixed concrete from the internal volume 30 of the mixing drum 14 to the main chute 46 and, ultimately, the desired location.

The platform 54 includes a perforated surface that surrounds the charge hopper 42 and the discharge hopper 44. In some embodiments, the platform 54 includes an asymmetric base. The platform 54 includes platform sides extending beneath the perforated surface. A guardrail 56 is coupled to the platform 54 and follows the contour of a periphery of the platform 54. The platform 54 is situated at a position near the drum opening 72 of the mixing drum 14 to facilitate access by the operator to the drum opening 72, the internal volume 30, the charge hopper 42, the discharge hopper 44, and/or the main chute 46. In some embodiments, the concrete mixer truck 10 includes a ladder 98 that extends downward from a side of the platform 54 to allow an operator to climb and reach the platform 54.

The charge hopper 42 includes a first portion 52 that is configured to receive materials during a charging/loading operation. The first portion 52 has a rim 58 (e.g., opening) formed at a free end of the first portion 52. The charge hopper 42 includes a second portion 53 aligned with the bottom of the first portion 52. According to an exemplary embodiment, the charge hopper 42 is selectively repositionable/movable. In some embodiments, the charge hopper 42 is configured to rotate about a horizontal, lateral axis. In some embodiments, the charge hopper 42 is configured to raise and lower vertically. Specifically, the charge hopper 42 is configured to lift, pivot, or otherwise move between a first position (e.g., a lowered position, loading position, a charging position, etc.) and a second position (e.g., a raised position, a dispensing/discharging position, a pivoted position, etc.) above or shifted from the first position. In the first position, the charge hopper 42 is configured to direct material (e.g., concrete, etc.) from a source positioned above the concrete mixer truck 10 (e.g., a batch plant, etc.) through the drum opening 72 and into the internal volume 30 of the mixing drum 14. The first position may also facilitate transport of the concrete mixer truck 10 by lowering the overall height of the concrete mixer truck 10. In the second position, the charge hopper 42 moves (e.g., lifts, pivots, etc.) away from the drum opening 72 and facilitates material flowing unobstructed out of the drum opening 72 and into the discharge hopper 44 and the main chute 46.

A hopper actuator 66 is positioned to move the charge hopper 42 between the first position and the second position. The hopper actuator 66 facilitates selectively controlling movement of the charge hopper 42 between the first position and the second position. The hopper actuator 66 is coupled to and extends between the charge hopper 42 and the platform 54. In some embodiments, the hopper actuator 66 is a hydraulic cylinder. In other embodiments, the hopper actuator 66 is another type of actuator (e.g., a pneumatic cylinder, a lead screw driven by an electric motor, an electric motor, etc.).

When receiving the material, the charge hopper 42 may be in the first position and the main chute 46 may be in a first configuration (e.g., a transport configuration, a stored configuration, etc.). Accordingly, material can be deposited into the charge hopper 42, and the charge hopper 42 directs the material into the internal volume 30 of the mixing drum 14 through the drum opening 72. While material is being added to the mixing drum 14, the drum driver 114 may be operated to drive the mixing drum 14 to agitate the material and facilitate fully loading/packing the mixing drum 14. Alternatively, the mixing drum 14 may be stationary while material is added to the mixing drum 14. When discharging and the charge hopper 42 is in the second position, the discharge hopper 44 funnels material from the mixing drum 14 into the main chute 46.

The main chute 46 functions as an outlet of the mixing drum 14 and is used to direct concrete dispensed from the internal volume 30 of the mixing drum 14 and through the discharge hopper 44 to a target location near the concrete mixer truck 10. The main chute 46 is pivotally coupled to the platform 54 and/or the discharge hopper 44 such that the main chute 46 is configured to rotate about both a vertical axis and a horizontal axis. The main chute 46 includes a base section 124 that may be pivotally coupled to the platform 54 and/or the discharge hopper 44. An extension chute 48 (e.g., a folding section, a second chute section, etc.) is pivotally coupled to the distal end of the base section 124. In some embodiments, a plurality of extension chutes 48 are pivotally connected to one another. One or more removable/detachable extension chutes 68 may be selectively coupled to the distal end of the extension chute 48. The main chute 46 is selectively reconfigurable between a first configuration (e.g., a storage configuration, a transport configuration, etc.) and a second configuration (e.g., a use configuration, a dispensing configuration, etc.). In the first configuration, (i) the base section 124 may be selectively oriented substantially horizontal and extending laterally outward, (ii) the extension chute 48 may be selectively pivoted relative to the base section 124 and extending substantially vertically, and (iii) the removable extension chutes 68 may be removed from the extension chute 48 and stored elsewhere in the concrete mixer truck 10 (e.g., coupled to the chassis 12 beneath the mixing drum 14, etc.). In the first configuration, the main chute 46 may, therefore, minimally obscure the view of an operator positioned within the cab 18. In the second configuration, (i) the extension chute 48 may be pivoted relative to the base section 124 from the substantially vertical orientation to a substantially horizontal orientation such that the base section 124 and the extension chute 48 are aligned with one another to form a continuous path through which material can flow, and (ii) one or more of the removable extension chutes 68 may be coupled to the distal end of the extension chute 48 to increase the length of the main chute 46 (e.g., to distribute concrete further away from the concrete mixer truck 10, etc.).

A first chute actuator 122 (e.g., a chute raising/lowering actuator, etc.) is coupled to and extends between the main chute 46 (e.g., a distal end thereof, etc.) and the chassis 12. In some embodiments, the first chute actuator 122 extends between the main chute 46 and the front bumper 158. The first chute actuator 122 is configured to raise and lower the main chute 46 to control the orientation of the main chute 46 relative to a horizontal plane (e.g., the ground, etc.). In some embodiments, the first chute actuator 122 is a pair of opposing hydraulic cylinders. In other embodiments, the first chute actuator 122 is another type of actuator (e.g., a pneumatic cylinder, a lead screw driven by an electric motor, a single hydraulic cylinder, etc.). In some embodiments, the first chute actuator 122 and the main chute 46 are both configured to rotate about the same or substantially the same vertical axis (e.g., as the main chute 46 is pivoted about the vertical axis as described in more detail herein).

A second chute actuator 94 (e.g., a chute pivot/rotation actuator, etc.) is coupled to the base section 124 of the main chute 46 and the platform 54. The second chute actuator 94 is configured to rotate the main chute 46 about a vertical axis. The second chute actuator 94 is configured to move the distal end of the main chute 46 through an arc along the left, front, and right sides of the chassis 12 (e.g., a 150 degree arc, a 180 degree arc, a 210 degree arc, etc.). In one embodiment, the second chute actuator 94 is a hydraulic motor. In other embodiments, the second chute actuator 94 is another type of actuator (e.g., a pneumatic motor, an electric motor, etc.).

A third chute actuator 78 (e.g., a chute folding/unfolding actuator, etc.) is configured to reposition (e.g., extend and retract, fold and unfold, etc.) the extension chute 48 relative to the base section 124 of the main chute 46. The third chute actuator 78 may be coupled to and extend between the base section 124 and the extension chute 48. In some embodiments, the third chute actuator 78 includes a plurality of actuators positioned to reposition a first extension chute 48 relative to the base section 124 and one or more second extension chutes 48 relative to the first extension chute 48. The first chute actuator 122, the second chute actuator 94, and the third chute actuator 78 facilitate selectively reconfiguring the main chute 46 between the first configuration and the second configuration. In some embodiments, a controller (e.g., joystick) is configured to facilitate providing commands to control operation of the first chute actuator 122, the second chute actuator 94, and the third chute actuator 78 to direct the main chute 46 and concrete flow therefrom. In some embodiments, a hopper pump may be coupled to the chassis 12 and configured to provide pressurized hydraulic fluid to power the first chute actuator 122, the second chute actuator 94, and/or the third chute actuator 78. The hopper pump may be a variable displacement pump or a fixed displacement pump. Additionally or alternatively, a pneumatic pump and/or an electrical storage and/or generation device is used to power one or more of the first chute actuator 122, the second chute actuator 94, and/or the third chute actuator 78.

Once at the job site, the concrete mixer truck 10 may be configured to dispense the material to a desired location (e.g., into a form, onto the ground, etc.). The charge hopper 42 may be repositioned into the second position from the first position by the hopper actuator 66. The extension chute(s) 48 may be extended by the third chute actuator(s) 78 to reconfigure the main chute 46 into the second configuration from the first configuration. An operator can then couple one or more removable extension chutes 68 to the distal end of the extension chute 48 to increase the overall length of the main chute 46 (as necessary). Once the main chute 46 is in the second configuration, the operator can control the first chute actuator 122 and/or the second chute actuator 94 to adjust the orientation of the main chute 46 (e.g., about a vertical axis, about a lateral axis, etc.) and thereby direct the material onto the desired location. Once the main chute 46 is in the desired orientation, the operator can control the drum driver 114 to rotate the mixing drum 14 in the second direction, expelling the material through the drum opening 72, into the discharge hopper 44, and into the main chute 46. The operator may control the speed of the mixing drum 14 to adjust the rate at which the material is delivered through the main chute 46. Throughout the process of dispensing the material, the operator can change the location onto which the material is dispensed by varying the orientation of the main chute 46 and/or by controlling the drive system 20 to propel/move the concrete mixer truck 10.

The drive system 20 is configured to propel the concrete mixer truck 10 and may drive other systems of the concrete mixer truck 10 (e.g., the drum driver 114, etc.). The drive system 20 includes driven tractive assemblies that include a front axle assembly 132 and a pair of rear axle assemblies 134, each coupled to various wheels 4. In some embodiments, the drive system 20 includes a driveshaft coupled to the front axle assembly 132 and/or the rear axle assemblies 134. The front axle assembly 132 and the rear axle assemblies 134 are coupled to the power plant module 62 through the drive system 20 such that the front axle assembly 132 and the rear axle assemblies 134 at least selectively receive mechanical energy (e.g., rotational mechanical energy) and propel the concrete mixer truck 10. In some embodiments, a pusher axle assembly 168 (e.g., tag axle assembly, etc.) is configured to be raised and lowered to selectively engage the support surface (e.g., based on the loading of the concrete mixer truck 10, etc.). Such a configuration distributes the pressure exerted on the ground by the concrete mixer truck 10, which may be required, for example, when traveling through certain municipalities under load.

The power plant module 62 (e.g., prime mover module, driver module, etc.) is configured to supply rotational mechanical energy to drive the concrete mixer truck 10. The power plant module 62 is coupled to the chassis 12 and positioned near the longitudinal center of the concrete mixer truck 10, beneath the mixing drum 14. According to an exemplary embodiment, the power plant module 62 receives a power input from the engine module 110. In some embodiments, the power plant module 62 includes a transmission and/or an electromagnetic device (e.g., an electrical machine, a motor/generator, etc.) coupled to the transmission. In some embodiments, the transmission and the electromagnetic device are integrated into a single device (e.g., an electromechanical infinitely variable transmission, an electromechanical transmission, etc.). The electromagnetic device is configured to provide a mechanical energy input to the transmission. By way of example, the electromagnetic device may be configured to supply a rotational mechanical energy input to the transmission (e.g., using electrical energy generated from the mechanical power input provided by the engine module 110, etc.). In some embodiments, the power plant module 62 and/or the drive system 20 includes additional pumps (hydraulic fluid pumps, water pumps, etc.), compressors (e.g., air compressors, air conditioning compressors, etc.), generators, alternators, and/or other types of energy generation and/or distribution devices configured to transfer the energy from the power plant module 62 to other systems.

The fuel system 108 is configured to provide fuel to the engine module 110 and/or other components of the concrete mixer truck 10. Specifically, the fuel system 108 may be configured to provide fuel to an engine 74 of the engine module 110. The engine 74 may use the fuel in an internal combustion process to generate a mechanical power output that is provided to the power plant module 62 (e.g., to generate electricity, to power onboard electric motors used to at least one of rotate wheel and tire assemblies, to drive the transmission etc.) and/or to power the drum driver 114. The fuel system 108 may include one or more valves, hoses, regulators, filters, and/or various other components configured to facilitate providing fuel to the engine 74. The fuel system 108 includes a container 126 (e.g., a vessel, reservoir, tank, etc.) that is configured to store a fluid (e.g., fuel, air, hydraulic fluid, etc.). The container 126 is disposed behind the drum driver 114 along the chassis 12. In other embodiments, the container 126 is coupled to a side of the rear pedestal 26. In some embodiments, the container 126 is coupled to the chassis 12 and positioned directly beneath the mixing drum 14. According to an exemplary embodiment, the container 126 includes a fuel tank that stores fuel used to power the engine 74. In some embodiments, the container 126 additionally or alternatively includes an air tank configured to store compressed air (e.g., for use in an air brake system, for use when raising and lowering the pusher axle assembly 168, etc.). In some embodiments, the container 126 additionally or alternatively includes a hydraulic tank configured to store hydraulic fluid for use in one or more hydraulic circuits (e.g., a hydraulic circuit that includes the drum driver 114, etc.).

A cover assembly 120 including a plurality of cover panels is positioned between the second end 38 of the mixing drum 14 and the engine module 110. The cover assembly 120 is disposed around the fuel system 108 (e.g., the container 126, etc.), the drum driver 114, and the rear pedestal 26. The cover assembly 120 is configured to protect the various internal components from debris. Such debris may be encountered while the concrete mixer truck 10 is driven along a roadway, for example. The cover assembly 120 may also protect the various internal components from damage due to collisions with trees, poles, or other structures at a jobsite or while transporting concrete. In some embodiments, all or some of the fuel system 108 is incorporated under a hood 86 of the engine module 110.

The engine module 110 is coupled to the frame rails 40 proximate the rear end 24 of the chassis 12. The engine module 110 is configured to directly, or indirectly, supply the various components of the concrete mixer truck 10 with the power needed to operate the concrete mixer truck 10. By way of example, the engine module 110 may be configured to provide mechanical energy (e.g., rotational mechanical energy) (i) to one or more components directly (e.g., via a power-take-off, etc.) to drive the one or more components (e.g., a hydraulic pump of the drum driver 114, etc.) and/or (ii) to the power plant module 62 to drive the one or more components indirectly. The engine module 110 may be defined by any number of different types of power sources. According to an exemplary embodiment, the engine module 110 includes the engine 74 coupled to the frame rails 40 and disposed within the hood 86. The engine 74 may include an internal combustion engine configured to utilize one or more of a variety of fuels (e.g., gasoline, diesel, bio-diesel, ethanol, natural gas, etc.) to output mechanical energy. In some embodiments, at least one of the drum drive motor 130, the first chute actuator 122, the second chute actuator 94, and the third chute actuator 78 is electrically driven (i.e., powered using electrical energy) rather than hydraulically driven.

In some embodiments, the engine module 110 additionally or alternatively includes multiple battery modules (e.g., batteries, capacitors, ultra-capacitors, etc.) spread throughout the concrete mixer truck 10, which cooperate to act collectively as an energy storage device. The engine module 110 can be charged through an onboard energy source (e.g., through use of an onboard generator powered by an internal combustion engine, by operating the electromagnetic device as a generator, during regenerative braking, through an onboard fuel cell, through an onboard solar panel, etc.) or through an external energy source (e.g., when receiving mains power from a power grid, etc.). In some embodiments, the concrete mixer truck 10 is a purely electric vehicle that does not include an internal combustion engine and, as such, is driven by electrical energy in all modes of operation. In such embodiments, the concrete mixer truck 10 may not include a fuel tank.

Trainer Cab

Figure 5:
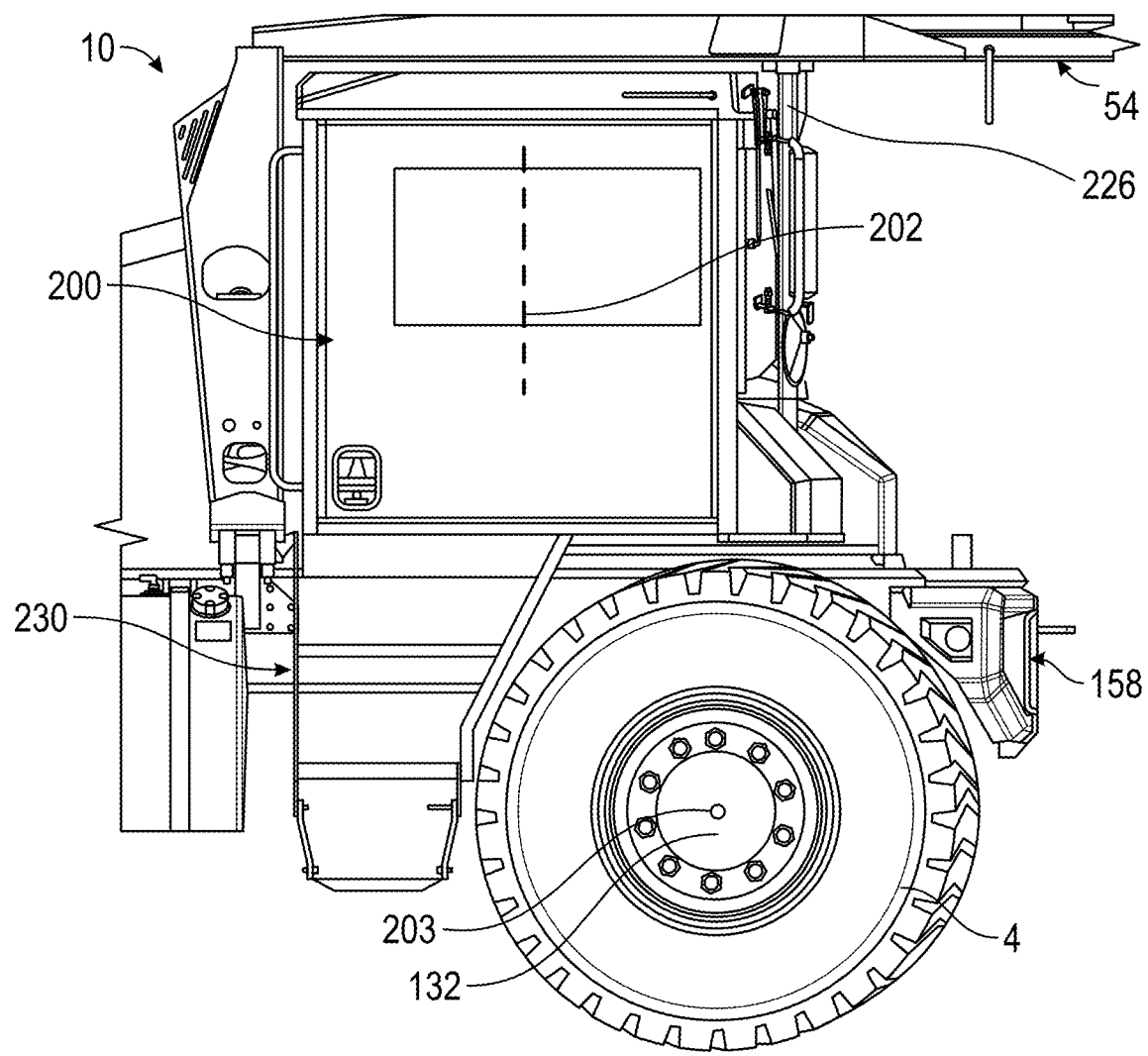
FIG. 5 is a side view of the concrete mixer vehicle and the trainer cab of FIG. 4, according to an exemplary embodiment.

According to the exemplary embodiments shown in FIGS. 4-11, the vehicle 10 may include a trainer cab 200 that is supported on and/or coupled to the chassis 12. By way of example, the cab 18 may be a main cab and the trainer cab 200 is a supplemental cab that is arranged laterally outward relative to the main cab 18. In some embodiments, as shown in FIG. 5, the trainer cab 200 may be arranged along the chassis 12 at a location that is substantially rearward (e.g., in a direction away from the front bumper 158) of the front axle assembly 132 (or a front wheel 4). By way of example, a centerline 202 defined by the trainer cab 200 (e.g., defined vertically along a centerline of the trainer cab 200 in a front-rear direction) may be arranged rearward of an axis 203 along which the front axle assembly 132 extends.

Figure 6:
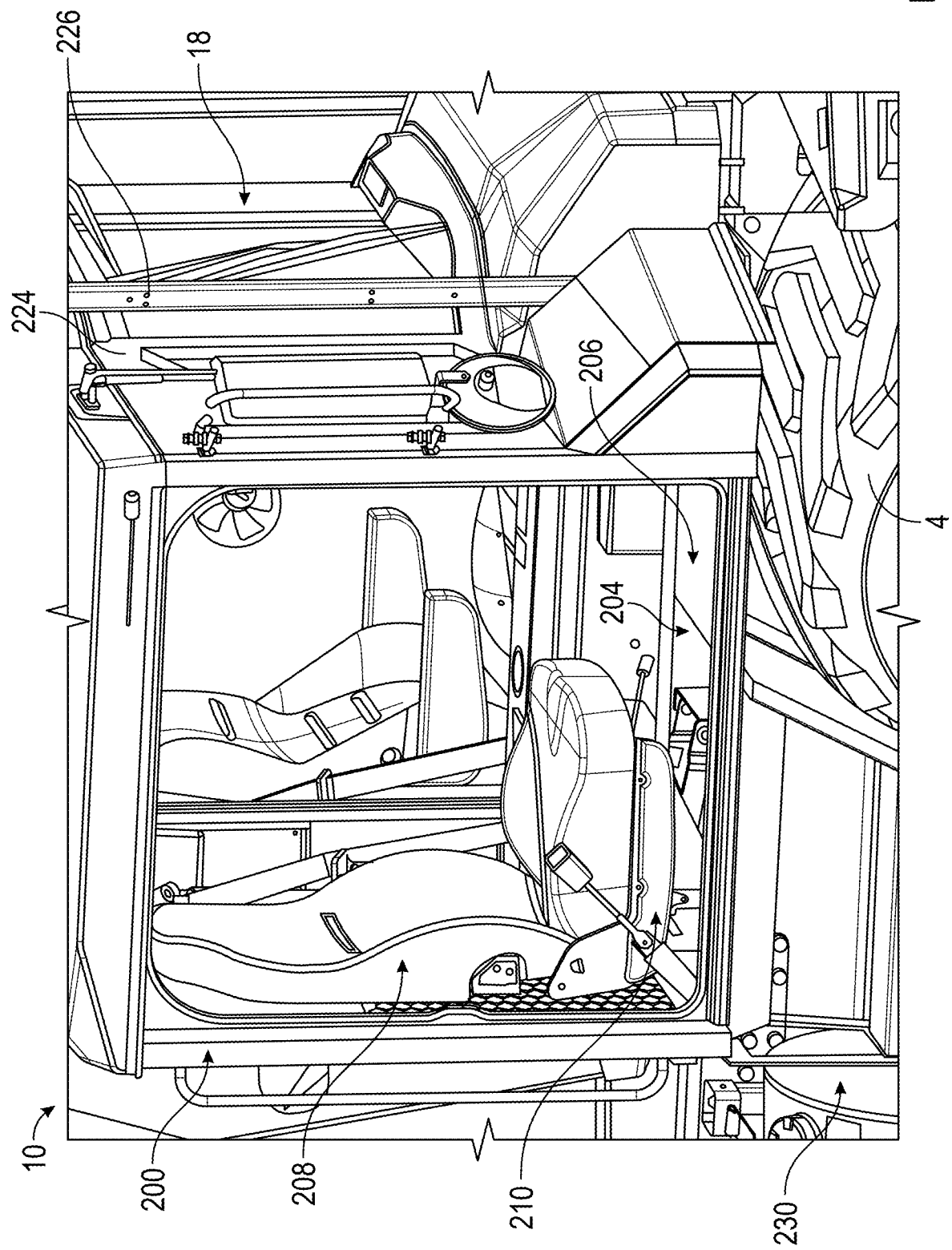
FIG. 6 is a front perspective view of the concrete mixer vehicle and the trainer cab of FIG. 4, according to an exemplary embodiment.
Figure 7:
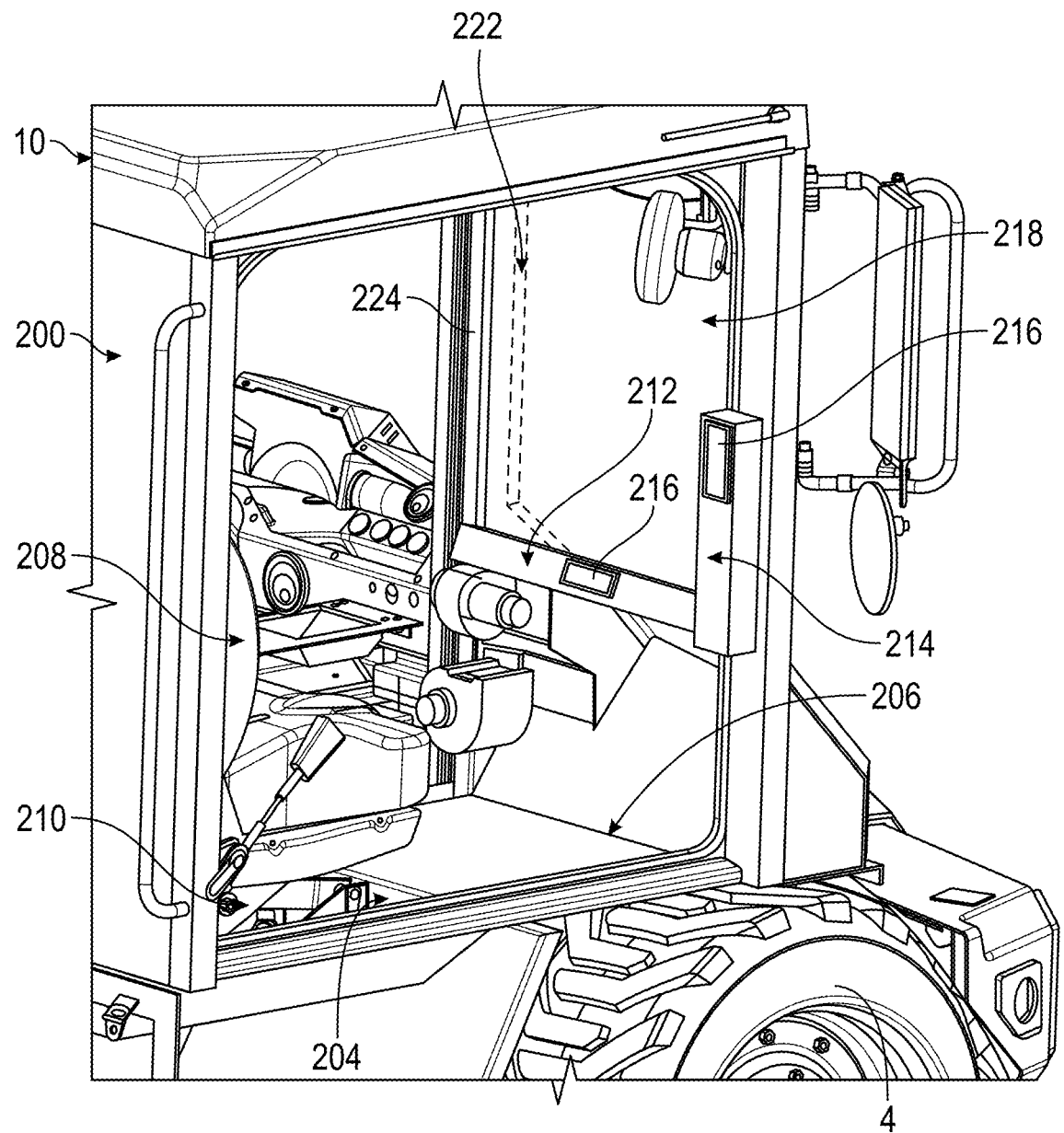
FIG. 7 is a rear perspective view of the concrete mixer vehicle and the trainer cab of FIG. 4, according to an exemplary embodiment.
Figure 8:
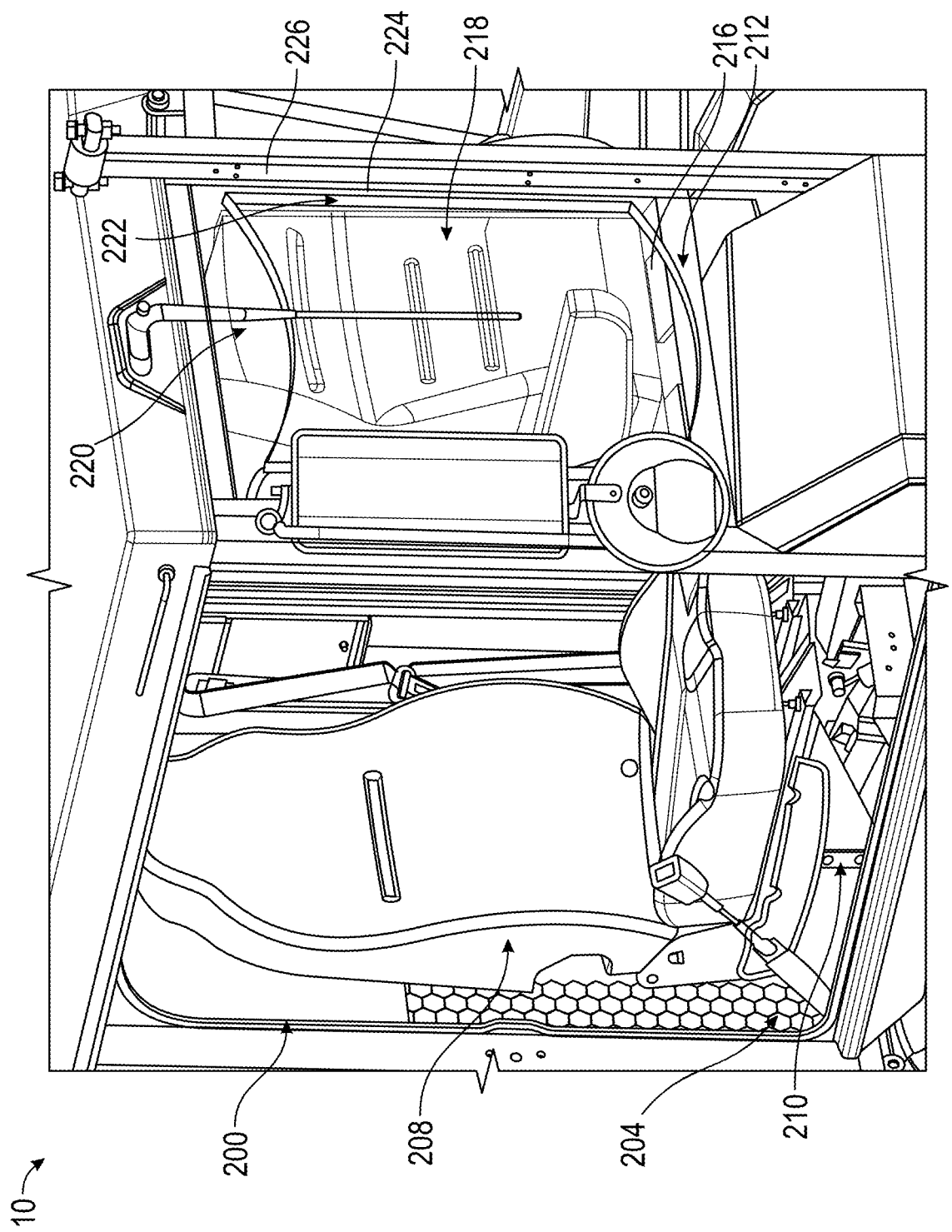
FIG. 8 is a front perspective view of the concrete mixer vehicle and the trainer cab of FIG. 4, according to an exemplary embodiment.
Figure 9:
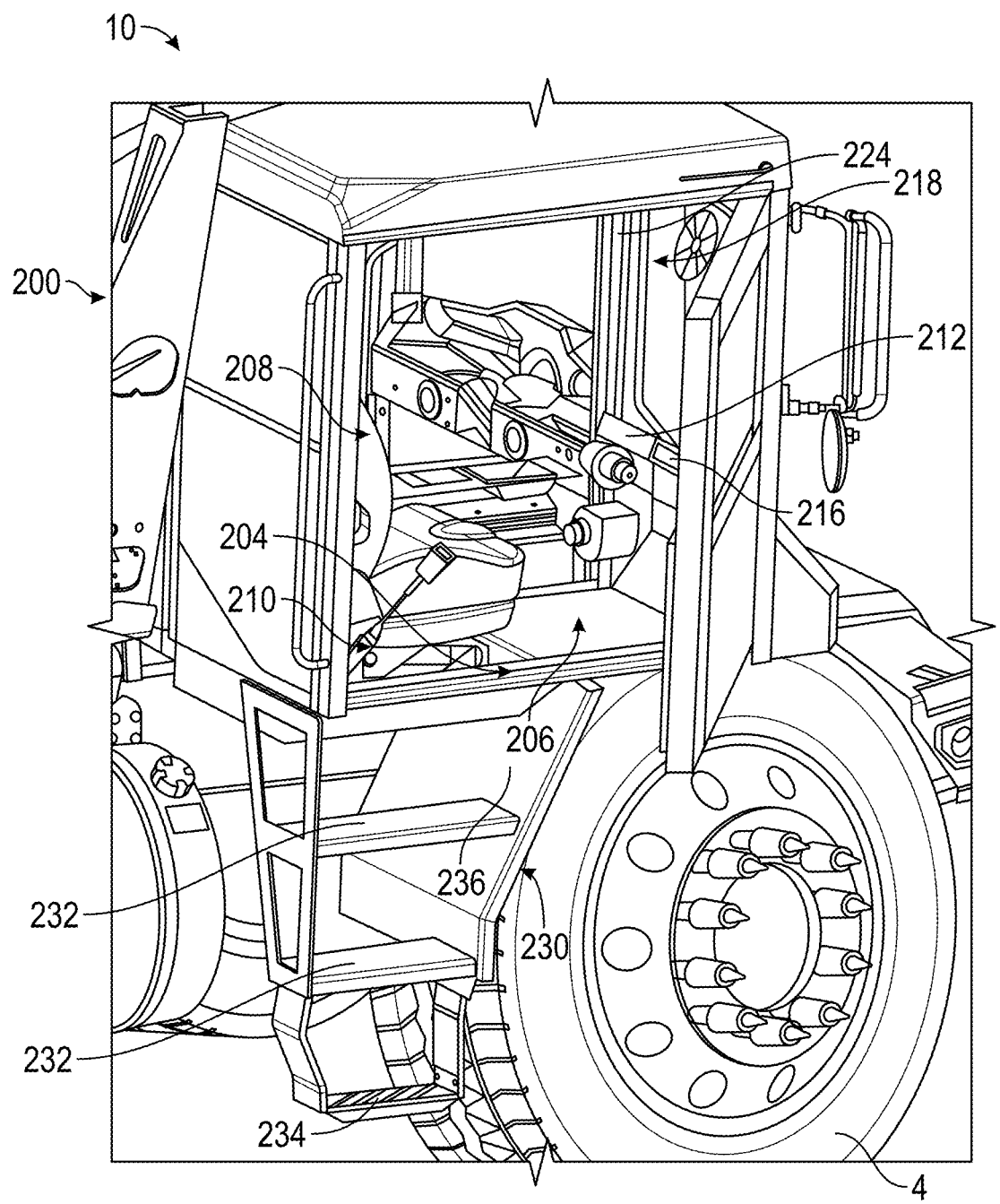
FIG. 9 is a rear perspective view of the concrete mixer vehicle and the trainer cab of FIG. 4, according to an exemplary embodiment.
Figure 10:
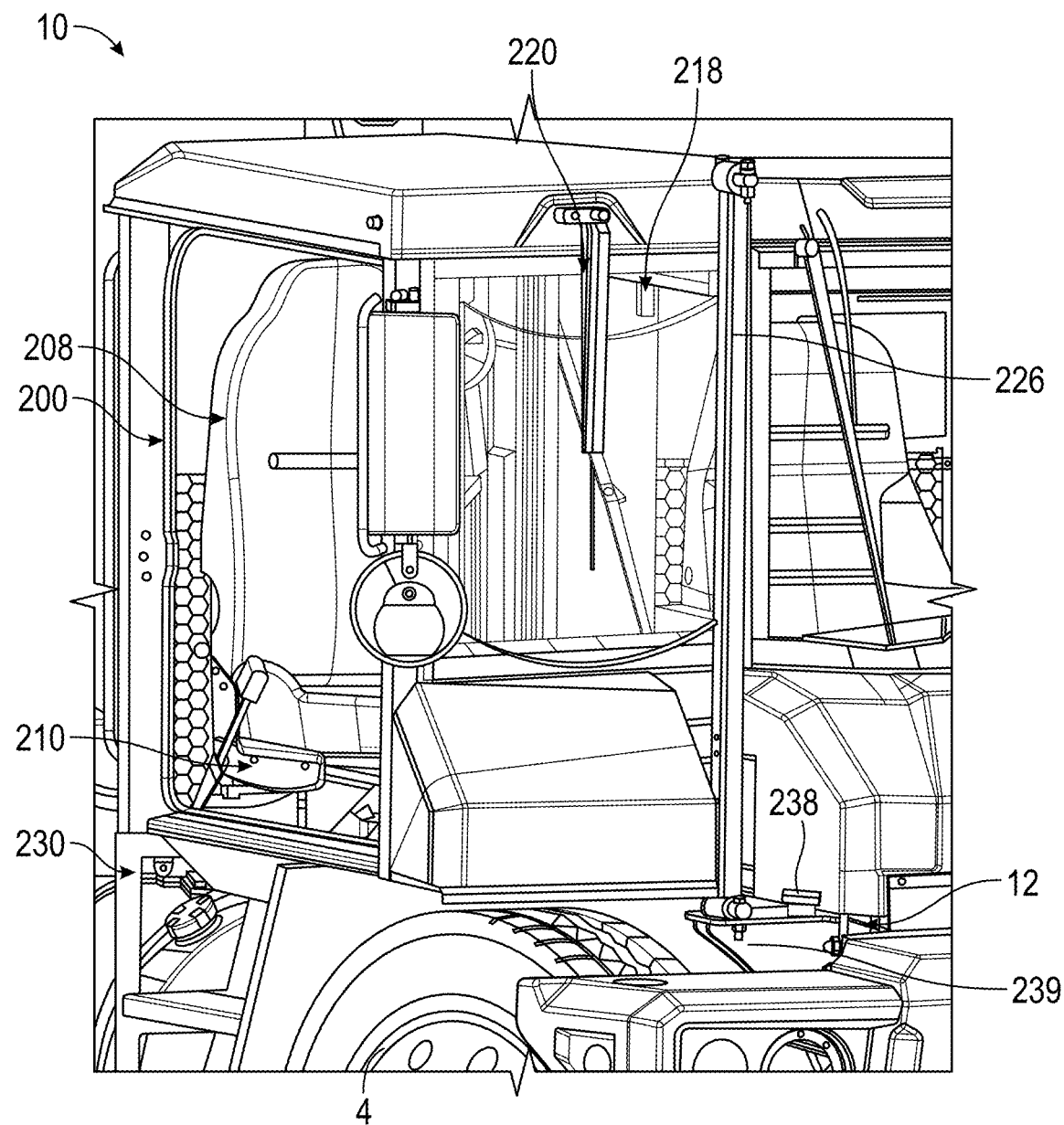
FIG. 10 is a front perspective view of the concrete mixer vehicle and the trainer cab of FIG. 4, according to an exemplary embodiment.
Figure 11:
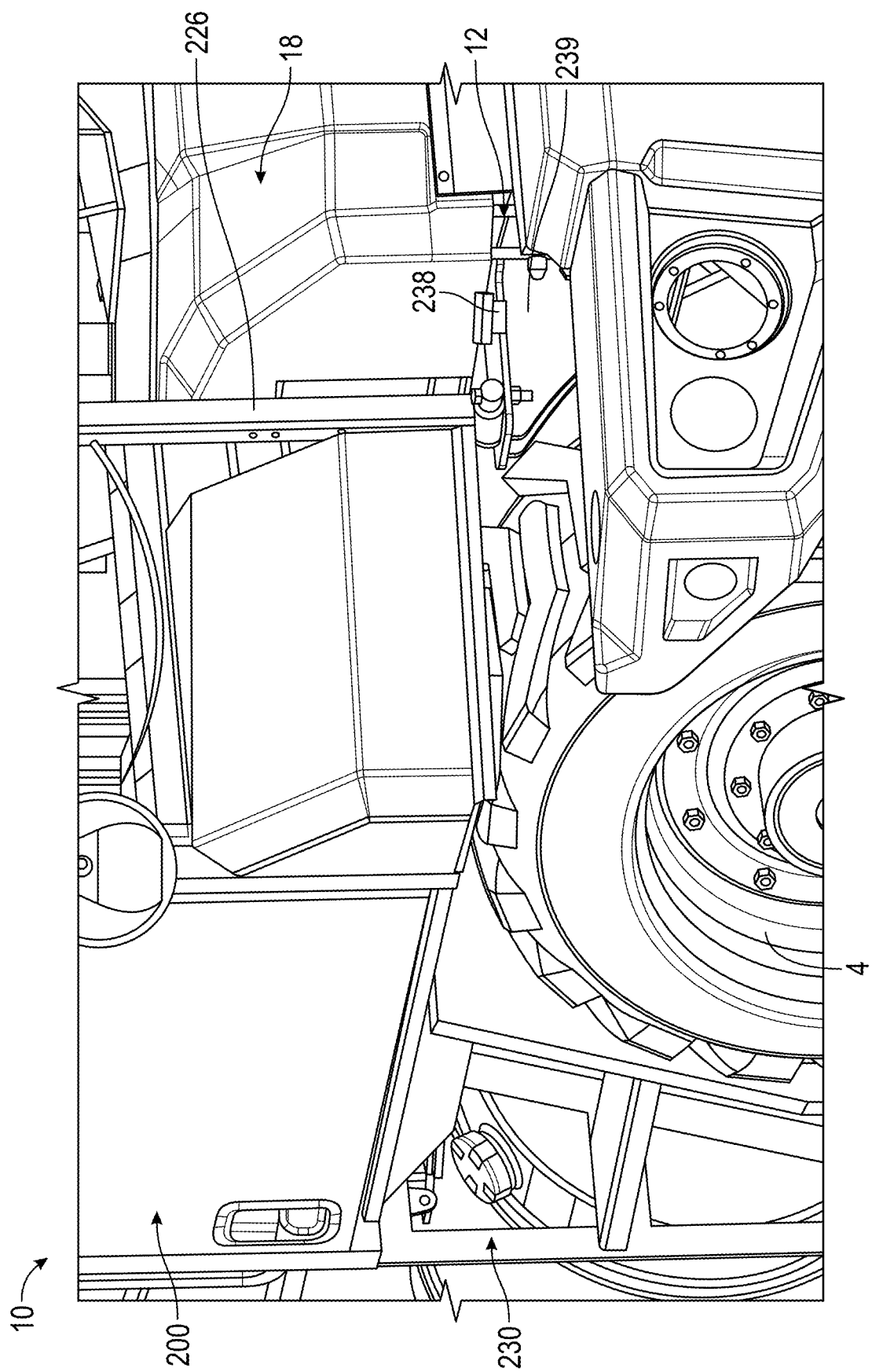
FIG. 11 is a front perspective view of a concrete mixer truck with a trainer cab, according to an exemplary embodiment.

According to an exemplary embodiment, arranging the trainer cab 200 generally rearward of the front axle assembly 132 provides clearance for the trainer cab 200 to include a recessed mounting floor 204 (see, e.g., FIGS. 6-8). In some embodiments, the recessed mounting floor 204 is arranged rearward of a wheel well 206 defined by the trainer cab 200. In general, a seat 208 of the trainer cab 200 is mounted on the recessed mounting floor 204, and the recessed design of the recessed mounting floor 204 provides added clearance (e.g., relative to a ceiling of the trainer cab 200) and accommodates the seat 208 traveling vertically due to an air suspension 210, which is coupled below the seat 208. By accommodating a range of vertical travel allowed by the air suspension 210 of the seat 208, the recessed mounting floor 204, and thereby the trainer cab 200, improve operator comfort over a range of operator heights.

According to an exemplary embodiment, the trainer cab 200 may include one or more multi-purpose support beams. By way of example, the trainer cab 200 includes a first support beam 212 and a second support beam 214 (see, e.g., FIG. 7). The first support beam 212 extends laterally along an interior of the trainer cab 200 and the second support beam 214 extends vertically along the interior of the trainer cab 200. Both of the first support beam 212 and the second support beam 214 provide structural integrity to the trainer cab 200 and include an air vent 216 integrated therein. That is, both of the first support beam 212 and the second support beam 214 may be at least partially hollow to define an air flow path therethrough, which is in communication with the air vent 216. As such, the first support beam 212 and the second support beam 214 both provide structural support and HVAC functionality to the trainer cab 200.

According to an exemplary embodiment, the trainer cab 200 includes a windshield 218 having a wiper 220 arranged thereon (see, e.g., FIG. 8). By way of example, the wiper 220 defines a park location 222 (a path of the wiper 220 is outlined in FIG. 8 and the park location 222 is shown in solid lines in FIG. 8 and dashed lines in FIG. 7) that is arranged between a trainer cab column 224 and a superstructure support beam 226 (e.g., in a front-rear direction or a longitudinal direction along which the chassis 12 extends). The arrangement of the park location 222 between the trainer cab column 224 and the superstructure support beam 226 prevents the wiper 220 from being viewed by an operator within the main cab 18 when the wiper 220 is in the park location 222, which improves operator visibility. In other words, the wiper 220 is hidden from being viewed from within the main cab 18 when the wiper 220 is in the park location 222. In some embodiments, the trainer cab column 224 defines a beam that extends internally within the trainer cab 200 and outlines at least a portion of the windshield 218. In some embodiments, the superstructure support beam 226 extends between the chassis 12 and the platform 54.

According to an exemplary embodiment, the trainer cab 200 includes an integrated step ladder 230 that is mounted to and hanging from a bottom side of the trainer cab 200 (see, e.g., FIGS. 5, 9, and 11-13). By way of example, the integrated step ladder 230 includes two hard-mounted steps 232 and a hanging step 234. In some embodiments, the integrated step ladder 230 includes more or less than two hard-mounted steps 232 and/or more than one hanging step 234. By way of example, the integrated step ladder 230 includes a fender plate 236 and the hard-mounted steps 232 extend rearwardly from the fender plate 236. The fender plate 236 forms a part of a wheel well for one of the wheels 4 coupled to the front axle assembly 132.

In general, the incorporation of the trainer cab 200 into the vehicle 10 minimizes an impact on the mounting of the main cab 18. For example, a cab mounting location for the main cab 18 may not change if the trainer cab 200 is installed on the vehicle 10 (see, e.g., FIGS. 10 and 11). In some embodiments, the main cab 18 is supported on or mounted to the chassis 12 using an isolator 238 (e.g., a vibration isolator including an elastomeric bracket or mounted block coupled between the main cab 18 and the chassis 12). In some embodiments, the isolator 238 is coupled to and supported on a frame bracket 239 that is coupled to the chassis 12 (e.g., to one of the frame rails 40). By way of example, a durometer defined by the isolator 238 may be changed to accommodate the increased weight supported on the chassis 12 due to the trainer cab 200, but the mounting location on the chassis 12 (e.g., on the frame bracket 239) remains unchanged. In some embodiments, a mounting location and arrangement of a superstructure (e.g., the drum assembly 6, the hopper assembly 8, the platform 54, etc.) and the corresponding superstructure supports (e.g., the superstructure support beam 226) also remains unchanged due to the incorporation of the trainer cab 200. For example, the superstructure support beam 226 is coupled between the bracket 239 and the platform 54 and the mounting location of the superstructure support beam 226 on the bracket 239 and the platform 54 remains unchanged due to the incorporation of the trainer cab 200.

Figure 12:
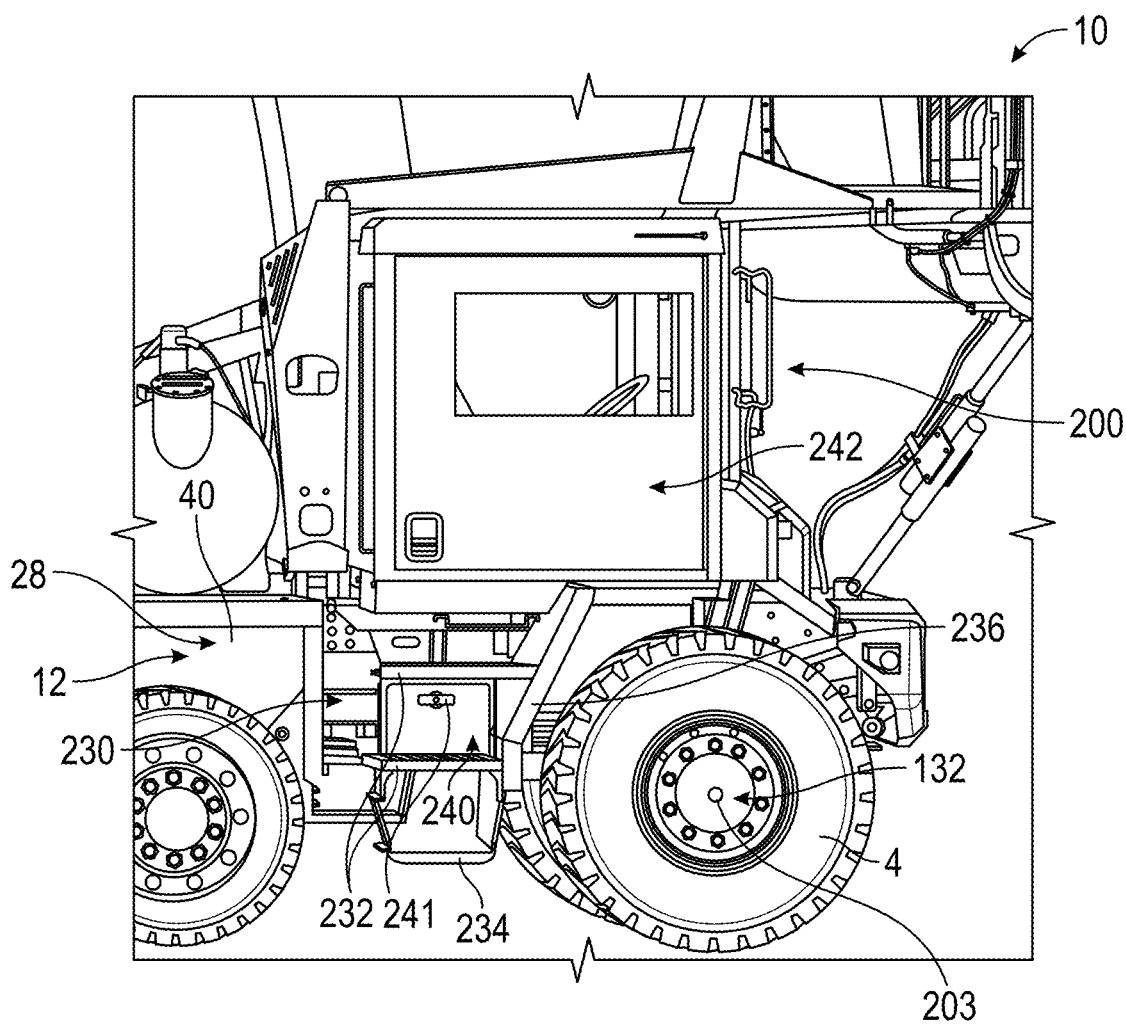
FIG. 12 is a side view of a concrete mixer truck with a trainer cab having a frame-mounted step ladder, according to an exemplary embodiment.
Figure 13:
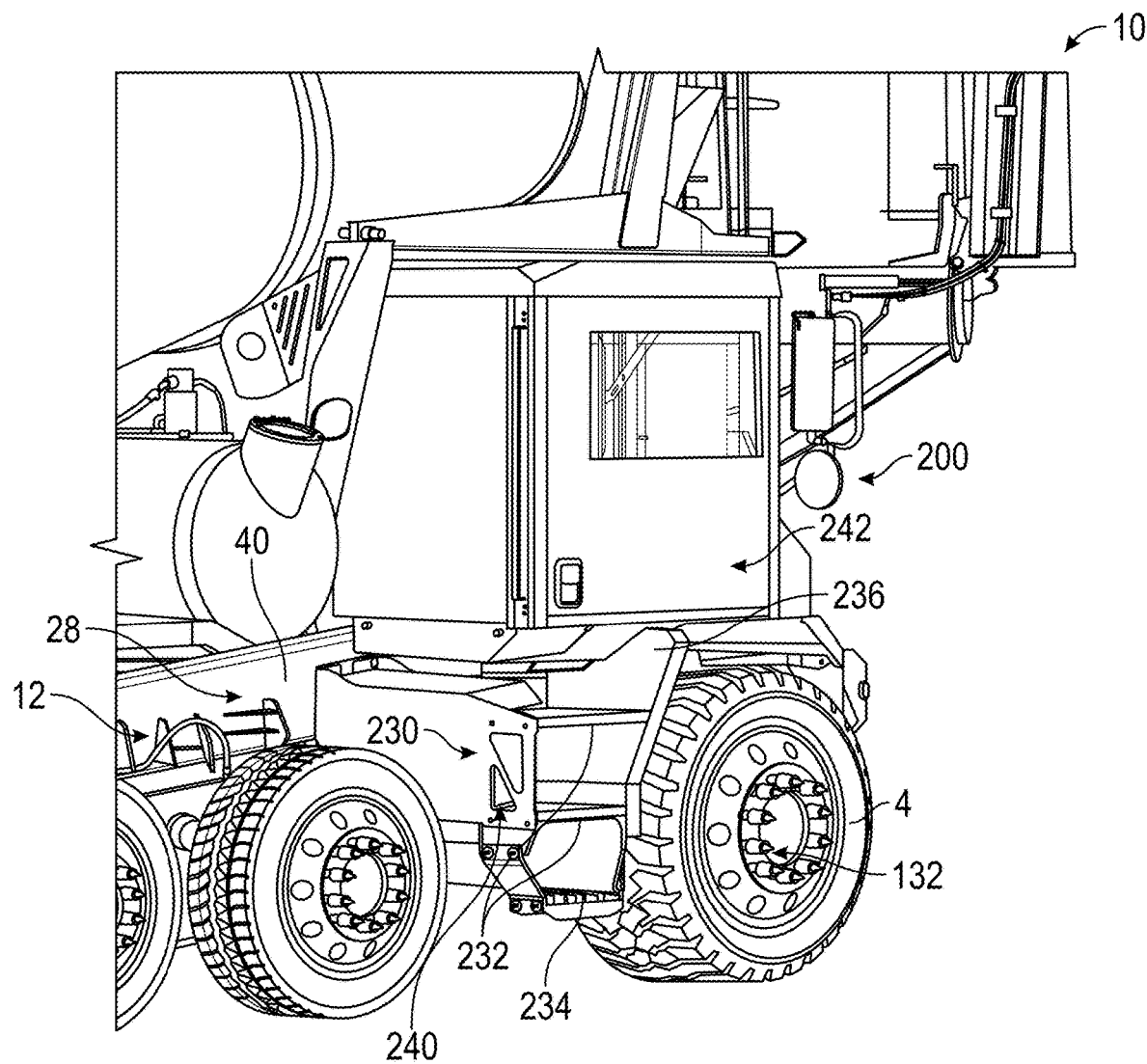
FIG. 13 is a rear perspective view of a concrete mixer truck with a trainer cab of FIG. 12, according to an exemplary embodiment.

FIGS. 12 and 13 show another embodiment of the trainer cab 200 where the step ladder 230 is isolated from the trainer cab 200. In general, the step ladder 230 of FIGS. 12 and 13 may be similar to the step ladder 230 of FIGS. 5-11, with like features identified using the same reference numeral, except as described herein or apparent from the figures. In the illustrated embodiment, the step ladder 230 is coupled to the chassis 12 (e.g., to one of the frame rails 40 of the frame 28) so that the step ladder 230 is isolated from the trainer cab 200 and the cab 18. In this way, for example, the step ladder 230 may be easily serviceable and allow a modular design where the step ladder 230 can be easily removed from or installed on the chassis 12, along with other components. For example, the step ladder 230 may include a toolbox 240 that is attached to or integrated into the step ladder 230. In some embodiments, the toolbox 240 includes a handle 241 that a user or operator may turn, or otherwise engage with, to open/close the toolbox 240 and selectively provide access to a storage volume defined by the toolbox 240. The storage volume defined by the toolbox 240 may be enclosed by the step ladder 230. In some embodiments, the toolbox 240 is arranged between the hard-mounted steps 232 (e.g., the two upper steps) of the step ladder 230. In some embodiments, the toolbox 240 is integrally formed with the step ladder 230 so that the step ladder 230 and the toolbox 240 are mounted/coupled as a single component onto the frame rail 40.

In the illustrated embodiment, the step ladder 230 is arranged rearwardly of the front axle assembly 132. For example, the step ladder 230 is arranged rearwardly (e.g., opposite to a travel direction of the vehicle 10) of the axis 203 along which the front axle assembly 132 extends. The step ladder 230 is arranged under a door 242 of the trainer cab 200. Specifically, the step ladder 230 is arranged on a lateral side of the trainer cab 200 so that an operator enters directly through the door 242 of the trainer cab 200 without having to maneuver around portions of the trainer cab 200 (e.g., going from a rearward portion of the trainer cab 200 to the lateral side where the door 242 is arranged), which provides a more ergonomic entry to and exit from the trainer cab 200 for an operator.

As utilized herein with respect to numerical ranges, the terms "approximately," "about," "substantially," and similar terms generally mean +/−10% of the disclosed values. When the terms "approximately," "about," "substantially," and similar terms are applied to a structural feature (e.g., to describe its shape, size, orientation, direction, etc.), these terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

It is important to note that the construction and arrangement of the concrete mixer truck 10 and the components thereof as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. A concrete mixer vehicle comprising:
   a chassis;
   an engine coupled to the chassis;
   a front axle coupled to the chassis;
   a rear axle coupled to the chassis;
   a main cab coupled to the chassis, the main cab defining an interior compartment;
   a trainer cab coupled to the chassis and arranged laterally outwardly relative to the main cab, wherein the trainer cab includes: (a) a seat mounted to a recessed mounting floor that is arranged rearward of a wheel well, (b) a support beam that includes an air vent and air flow path integrated into the support beam, or (c) a windshield wiper with a park location that is arranged between a trainer cab column and a superstructure support so that the windshield wiper is hidden from being viewed from within the main cab;
   a drum assembly coupled to the chassis, the drum assembly including:
      a mixing drum defining an aperture and an internal volume;
      a charge hopper positioned proximate the aperture; and
      a chute positioned proximate the aperture, beneath the charge hopper; and
   a hopper actuator positioned to move the charge hopper between a first position and a second position, the first position facilitating loading materials into the internal volume of the mixing drum via the charge hopper through the aperture, the second position facilitating discharging the materials from the internal volume, through the aperture, and to the chute.

2. The concrete mixer vehicle of claim 1, wherein the trainer cab includes the seat mounted to the recessed mounting floor that is arranged rearward of the wheel well.

3. The concrete mixer vehicle of claim 2, wherein an air suspension is mounted between the recessed mounting floor and the seat.

4. The concrete mixer vehicle of claim 2, further comprising a step ladder mounted under a door of the trainer cab.

5. The concrete mixer vehicle of claim 4, wherein the step ladder includes a fender plate that forms a portion of the wheel well.

6. The concrete mixer vehicle of claim 4, wherein the step ladder is arranged rearward of the front axle.

7. The concrete mixer vehicle of claim 4, wherein the step ladder is coupled to a frame rail of the chassis so that the step ladder is isolated from the trainer cab.

8. The concrete mixer vehicle of claim 7, wherein the step ladder includes an integrated toolbox formed between two steps of the step ladder.

9. The concrete mixer vehicle of claim 1, wherein the trainer cab includes the support beam that includes the air vent and air flow path integrated into the support beam.

10. The concrete mixer vehicle of claim 9, wherein the support beam extends vertically within the trainer cab.

11. The concrete mixer vehicle of claim 9, wherein the support beam extends laterally within the trainer cab.

12. The concrete mixer vehicle of claim 9, wherein the support beam is a first support beam that extends laterally along an interior of the trainer cab.

13. The concrete mixer vehicle of claim 12, further comprising a second support beam that extends vertically along an interior of the trainer cab, wherein the second support beam includes a second air vent and a second air flow path integrated into the second support beam.

14. The concrete mixer vehicle of claim 1, wherein the trainer cab includes the windshield wiper.

15. The concrete mixer vehicle of claim 1, wherein the trainer cab includes the seat, the support beam, and the windshield wiper.

16. A concrete mixer vehicle comprising:
a chassis;
an engine coupled to the chassis;
a front axle coupled to the chassis;
a rear axle coupled to the chassis;
a main cab coupled to the chassis, the main cab defining an interior compartment;
a trainer cab coupled to the chassis and arranged laterally outwardly relative to the main cab, wherein the trainer cab includes a seat mounted to a recessed mounting floor that is arranged rearward of a wheel well;
a step ladder coupled to the chassis and arranged under the trainer cab and rearward of the front axle;
a drum assembly coupled to the chassis, the drum assembly including:
a mixing drum defining an aperture and an internal volume;
a charge hopper positioned proximate the aperture; and
a chute positioned proximate the aperture, beneath the charge hopper; and
a hopper actuator positioned to move the charge hopper between a first position and a second position, the first position facilitating loading materials into the internal volume of the mixing drum via the charge hopper through the aperture, the second position facilitating discharging the materials from the internal volume, through the aperture, and to the chute.

17. The concrete mixer vehicle of claim 16, wherein the step ladder is mounted under a door of the trainer cab, and wherein the step ladder includes a fender plate that forms a portion of a wheel well.

18. The concrete mixer vehicle of claim 16, wherein the step ladder is coupled to a frame rail of the chassis so that the step ladder is isolated from the trainer cab.

19. The concrete mixer vehicle of claim 16, wherein the step ladder includes an integrated toolbox formed between two steps of the step ladder.

20. A concrete mixer vehicle comprising:
a chassis;
an engine coupled to the chassis;
a front axle coupled to the chassis;
a rear axle coupled to the chassis;
a main cab coupled to the chassis, the main cab defining an interior compartment;
a trainer cab coupled to the chassis and arranged laterally outwardly relative to the main cab, wherein the trainer cab includes a seat mounted to a recessed mounting floor that is arranged rearward of a wheel well;
a step ladder coupled to the chassis and arranged under the trainer cab and rearward of the front axle, wherein the step ladder includes a fender plate that forms a portion of the wheel well;
a drum assembly coupled to the chassis, the drum assembly including:
a mixing drum defining an aperture and an internal volume;
a charge hopper positioned proximate the aperture; and
a chute positioned proximate the aperture, beneath the charge hopper; and
a hopper actuator positioned to move the charge hopper between a first position and a second position, the first position facilitating loading materials into the internal volume of the mixing drum via the charge hopper through the aperture, the second position facilitating discharging the materials from the internal volume, through the aperture, and to the chute.

\* \* \* \* \*